(12) United States Patent
Holden

(10) Patent No.: US 6,204,973 B1
(45) Date of Patent: Mar. 20, 2001

(54) APPARATUS FOR DISPLAYING AN IMAGE SUSPENDED IN SPACE

(75) Inventor: John Holden, Hertfordshire (GB)

(73) Assignee: Central Research Labs, Ltd., Hayes, Middlesex (GB)

( * ) Notice: Subject to any disclaimer, the term of this patent is extended or adjusted under 35 U.S.C. 154(b) by 0 days.

(21) Appl. No.: 09/367,497

(22) PCT Filed: Jan. 21, 1998

(86) PCT No.: PCT/GB98/00186

§ 371 Date: Oct. 22, 1999

§ 102(e) Date: Oct. 22, 1999

(87) PCT Pub. No.: WO98/37450

PCT Pub. Date: Aug. 27, 1998

(30) Foreign Application Priority Data

Feb. 19, 1997 (GB) ................................... 9703446

(51) Int. Cl.[7] ........................... G02B 27/10; G02B 27/22; G03B 21/00
(52) U.S. Cl. ........................... 359/629; 359/477; 359/479; 353/10
(58) Field of Search ..................................... 359/471, 477, 359/479, 629, 630, 633; 353/10

(56) References Cited

U.S. PATENT DOCUMENTS

| | | | |
|---|---|---|---|
| 4,550,978 | * 11/1985 | Friedle | 359/630 |
| 5,477,385 | * 12/1995 | Freeman | 359/629 |
| 5,583,695 | * 12/1996 | Dobrusskin | 359/633 |
| 5,764,411 | * 6/1998 | Shanks | 359/483 |
| 5,861,993 | * 1/1999 | Shanks et al. | 359/629 |

FOREIGN PATENT DOCUMENTS

| | | | | |
|---|---|---|---|---|
| 0 460 873 A1 | * | 5/1991 | (EP) | H04N/13/04 |
| WO 96/29677 A1 | * | 9/1996 | (WO) | G06K/11/08 |

* cited by examiner

Primary Examiner—Georgia Epps
Assistant Examiner—David N. Spector
(74) Attorney, Agent, or Firm—William H. Bollman

(57) ABSTRACT

Apparatus for displaying an image suspended in space comprises an object (1) for display, a retroreflector (2) receiving light from the object, a beamsplitter (3) in a path for light from the object to the retroreflector, and a converging lens (4) between the beamsplitter and the retroreflector. The beamsplitter makes an oblique angle to the direction (6) of propagation of the light such that it transmits some light and reflects the rest. Light from the beamsplitter passes through the lens to the retroreflector which reflects it back through the lens to the beamsplitter. This retroreflected light is reflected and/or transmitted by the beamsplitter to form a real image (5) suspended in space. The use of a lens between the beamsplitter and the retroreflector improves image resolution and viewing angle, reduces the area of retroreflector required, and allows low cost bead retroreflectors to be used in high resolution displays.

14 Claims, 1 Drawing Sheet

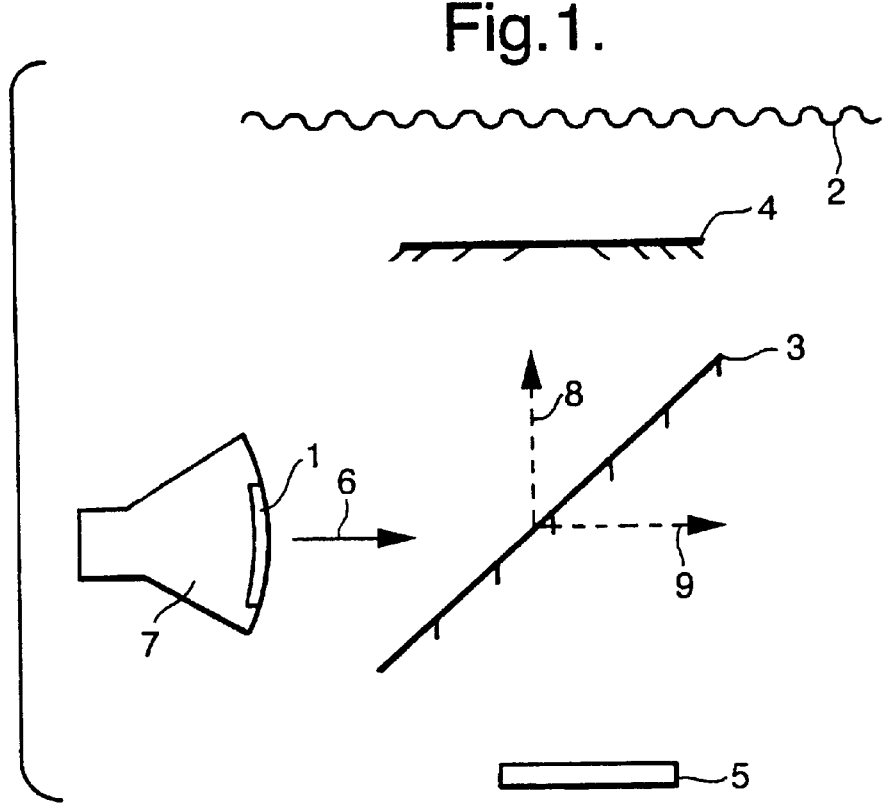
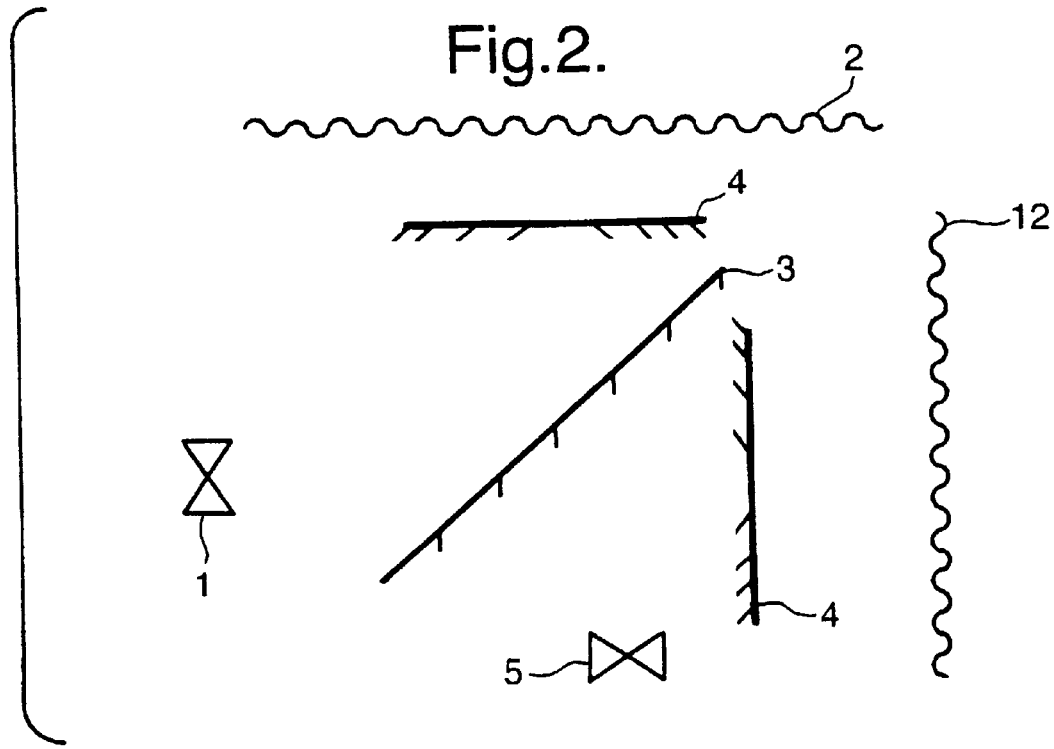

APPARATUS FOR DISPLAYING AN IMAGE SUSPENDED IN SPACE

BACKGROUND OF THE INVENTION

This invention relates to apparatus for displaying an image suspended in space, comprising: an object for display; a retroreflector being arranged to receive light from the object; a beamsplitter in a path for light from the object to the retroreflector, the beamsplitter being arranged at an oblique angle to the direction of propagation of the light such that it transmits part of the light and reflects part of the light, the light being either transmitted or reflected by the beamsplitter is received by the retroreflector and is reflected by it back to the beamsplitter, which either reflects or transmits part of this retroreflected light to form a real image suspended in space.

A known display apparatus of this type is described in EP-A-0460873.

SUMMARY OF THE INVENTION

According to a first aspect of the present invention there is provided apparatus for displaying an image suspended in space, comprising: an object for display, a retroreflector which is arranged to receive light from the object, and a beamsplitter in a path for light from the object to the retroreflector. The beamsplitter is arranged at an oblique angle to the direction of propagation of the light such that it transmits part of the light and reflects part of the light. The light, which is either transmitted or reflected by the beamsplitter, is received by the retroreflector and is reflected by it back to the beamsplitter, which either reflects or transmits part of this retroreflected light, to form a real image suspended in space, characterized by the apparatus further comprising a converging optical element which is arranged between the beamsplitter and the retroreflector such that in use light from the beamsplitter passes through the converging optical element to the retroreflector, which reflects it back through the optical element towards the beamsplitter. The presence of a converging optical element between the beamsplitter and the retroreflector can improve the viewing angle, or reduce the area of retroreflector required to provide a given viewing angle for a real image suspended in space, or both.

Preferably a first retroreflector is provided to receive light being transmitted by the beamsplitter from the object and a further retroreflector is provided to receive light being reflected by the beamsplitter from the object, such that light being reflected from both retroreflectors forms the real image suspended in space, thereby increasing the brightness of the real image.

Very preferably, the converging optical element is located such that it forms an image of the given object or image in the plane of the retroreflector. This can improve the resolution of the real image suspended in space significantly, and for example allows low cost bead retroreflectors to be used in high resolution displays.

If the object is three dimensional, then the real image appears as a three dimensional image projected into or suspended in space.

According to a second aspect of the invention there is provided an apparatus in which the retroreflector is replaced by a specularly reflective surface which forms a real or virtual image suspended in space.

BRIEF DESCRIPTION OF THE DRAWINGS

Embodiments of the invention will now be described, by way of example only, with reference to the accompanying diagrammatic drawings, in which FIG. 1 shows a plan view of a first embodiment, and FIG. 2 shows a plan view of a second embodiment.

DETAIL DESCRIPTION OF ILLUSTRATIVE EMBODIMENTS

FIG. 1 shows an apparatus according to the invention for displaying a real image suspended space. The apparatus comprises an object (1) for display; a retroreflector (2) being arranged to receive light from the object; a beamsplitter (3) in a path for light from the object to the retroreflector, the beamsplitter being arranged at an oblique angle to the direction of propagation (6) of the light such that it transmits part of the light (9) and reflects part of the light (8), the light being either transmitted or reflected by the beamsplitter is received by the retroreflector and is reflected by it back to the beamsplitter, which either reflects or transmits part of this retroreflected light to form a real image (5) suspended in space. The apparatus further comprises a converging optical element, in the present example being a lens (4) being arranged between the beamsplitter (3) and the retroreflector (2) such that light from the beamsplitter passes through the lens to the retroreflector which reflects it back through the lens towards the beamsplitter.

In the present embodiment the object (1) comprises an image being displayed by a visual display unit (7), and the retroreflector comprises a sheet of bead type retroreflective material. Alternative embodiments may be made by using, for example, an illuminated solid object in place of the visual display unit. As a further alternative the retroreflective material may comprise a sheet of a corner cube retroreflector material, or a triple mirror retroreflector, or other direction selective screen.

A second embodiment according to the invention is shown in FIG. 2. In this embodiment a pair of sheets of retroreflective material (2, 12) are provided, and respective converging lenses (4, 14) are arranged between the beamsplitter and each retroreflector. This arrangement reduces the amount of light lost and therefore increases the apparent brightness of the suspended image. The presence of a second retroreflector is advantageous even if the second converging lens (14) were removed from this embodiment, as the suspended image would appear to be as brighter than in the first embodiment and almost as clear.

It is believed that the reason that the presence of a converging optical element such as a lens is so advantageous is that contrary to simple theory a ray of light incident on a retroreflector will not be returned precisely along the direction from which it came because of diffraction effects, manufacturing tolerances, translational shifts, or other causes of imperfect retroreflection. As a result the incident ray becomes a narrow cone of light after retroreflection. If one places a converging lens in the path of this cone of light it will behave as if it had originated at a point source, and the lens will bring the cone of light to a focus. If the lens is positioned such that it forms an image of the object at the surface of the retroreflector, then the point at which the same lens will form an image of the point source from the cone of retroreflected light will coincide with the position of the original object, or where a beamsplitter diverts the light at the position of the suspended image. The result of the presence of the lens is a dramatic sharpening of the suspended image. The improvement is such that bead retroreflectors (which do not retroreflect perfectly and so usually give rise to poor quality suspended images) can be used to form suspended images showing resolutions of TV quality.

In addition, because light from the object is being focused onto the retroreflector material, a reduced area of retroreflector sheet is required. Hence smaller (cheaper) systems can be produced for a given viewing angle, or a greater viewing angle can be achieved with a given retroreflector area. Larger "seamless" images may be produced from a single retroreflective "tile" of a given size. Such tiles may be arranged in a two dimensional array if desired.

As an alternative to using a retroreflector, a specularly reflective surface or layer such as a mirror may be used, replacing the retroreflector at 2 in FIG. 1 for example. In this case the image formed after reflection by the specularly reflective surface will be either a real image or a virtual image depending upon the distance between the object and the converging optical element. The specularly reflective surface or layer may be partly light transmissive, or opaque.

The converging optical elements employed in the embodiments shown are Fresnel lenses, but conventional converging lenses can be used instead. Fresnel lenses have the advantage of being light in weight and cheap to manufacture. Any spacing between the converging lens and the retroreflector or reflective surface will fall within the scope of the invention of the present application. However, suspended images having the best resolution are formed when the optical distances between the object and the lens and the lens and the retroreflector are selected such that the converging lens produces an image of the object on or at the surface of the retroreflector. The apparatus is preferably arranged such that the distance between the retroreflector or specularly reflective layer and the converging optical element is selectable.

The converging optical element may as an alternative comprise a zone plate or holographic optical element which focuses light.

In a further embodiment the converging optical element is constituted by an array of smaller converging optical elements which between them collect the light which would have been collected by the single converging optical element of FIG. 1. The array of converging optical elements may, for example, share a common focal plan such as for example an array of converging lenses facing the retroreflector. The ford length of such "tiled" lenses can made very short—of the order of one or two centimetres—which can enable the lenses and the retroreflector(s) to be placed close together enabling the apparatus to be more compact whilst maintaining the improved resolution. Such lens arrays combine good quality optical performance, a large area over which to gather light, and a short focal length compared with the lateral dimension of the light gathering area.

What is claimed is:

1. An apparatus for displaying an image suspended in space, comprising:

an object for display;

a retroreflector which is arranged to receive light from the object;

a beamsplitter in a path for light from the object to the retroreflector, the beamsplitter is arranged at an oblique angle to the direction of propagation of the light such that it transmits part of the light and reflects part of the light, the light which is either transmitted or reflected by it back to the beamsplitter, which either reflects or transmits part of this retroreflected light, to form a real image suspended in space, characterized by the apparatus further comprising a converging optical element which is arranged between the beamsplitter and the retroreflector such that in use light from the beamsplitter passes through the converging optical element to the retroreflector, which reflects it back through the optical element toward the beamsplitter.

2. The apparatus as claimed in claim 1 in which a first retroreflector is provided to receive light being transmitted by the beamsplitter from the object and a further retroreflector is provided to receive light being reflected by the beamsplitter from the object, such that part of the light being reflected from both retroreflectors forms the real image suspended in space.

3. The apparatus as claimed in claim 2 in which a converging optical element is provided in the path of light from the beamsplitter to both the first and the further retroreflector.

4. The apparatus as claimed in claim 1 in which the converging optical element is located such that it forms an image of the given object or image at the retroreflector.

5. The apparatus as claimed in claim 1 in which the converging optical element comprises a Fresnel lens.

6. The apparatus as claimed in claim 1 in which the converging optical element comprises a array of converging optical elements.

7. The apparatus as claimed in claim 6 in which the converging opitical elements share a common focal plane.

8. An apparatus as claimed in claim 1 in which the object is an image being displayed by a visual display unit.

9. The apparatus as claimed in claim 1 in which the retroreflector is a bead retroreflector.

10. The apparatus as claimed in claim 1 in which the retroreflector is a triple mirror retroreflector.

11. The apparatus as claimed in claim 1 in which the retroreflector is a corner-cube retroreflector.

12. The apparatus as claimed in claim 1 in which the beamsplitter makes an angle of between 35 and 55 degrees to the direction of propagation of light from the object to the retroreflector.

13. The apparatus as claimed in claim 1 in which the retroreflector is replaced by a specularly reflective surface which forms a real or virtual image suspended in space.

14. The apparatus as claimed in claim 1 in which the distance between the converging lens and the retroreflector or specularly reflective surface is selectable.

* * * * *